INVENTORS
Almon J. Corson
Edwin C. Guptill
Their Attorney

United States Patent Office 2,947,941
Patented Aug. 2, 1960

2,947,941
SUPPRESSED ZERO VOLTMETER

Almon J. Corson, Marblehead, and Edwin C. Guptill, Peabody, Mass., assignors to General Electric Company, a corporation of New York Filed June 9, 1958, Ser. No. 740,939

5 Claims. (Cl. 324—131)

The following invention relates to a suppressed zero voltmeter and, in particular, to an instrument wherein a conventional D.-C. instrument is utilized to provide suppressed zero A.-C. indications.

It is known to utilize a D.-C. instrument in combination with a rectifying arrangement in order to measure A.-C. electrical values. It is desirable to utilize D.-C. instruments because of the linear scales and the higher sensitivities obtainable and also because of the use of standard components made possible. In order to obtain stable operation of the D.-C. instrument, it is usually necessary to utilize complex circuitry including bridge rectifying arrangements. Because of the fact that the D.-C. instrument receives pulses of rectified A.-C. current, obtaining stable operation, insensitivity to wave form variations, and accuracy of readings even with complex circuitry is usually not fully realized.

It is an object of our invention to provide an improved A.-C. voltmeter utilizing a D.-C. indicating instrument and a simplified rectifying arrangement.

It is another object of our invention to provide an improved A.-C. voltmeter which is stable, accurate, and substantially unaffected by wave form variations yet utilizes a minimum of components.

It is still another object of our invention to provide a self-contained low-cost A.-C. voltmeter having high accuracy and a limited span of measurement.

Further objects and advantages of our invention will become apparent as the following description proceeds and the features of novelty which characterize our invention will be pointed out with particularity in the claims annexed to and forming a part of this specification.

In accordance with one form of the invention, a Zener type diode is connected in a back-to-back arrangement with another diode with a resistance connected in parallel with the other diode, with the circuit connected in series with a resistor across the A.-C. signal being measured, and a D.-C. instrument to compare the forward and reverse cycles of the voltages across the diodes as an indication of the magnitude of the A.-C. signal.

Figure 1:
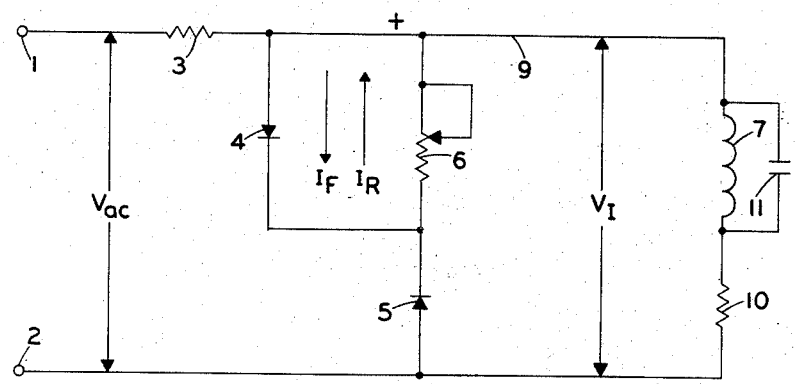
Figure 2:
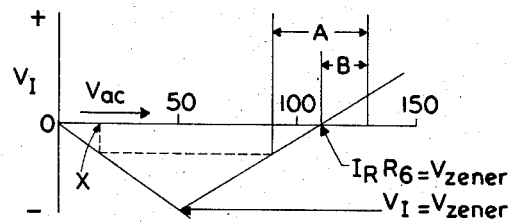
Figure 3:
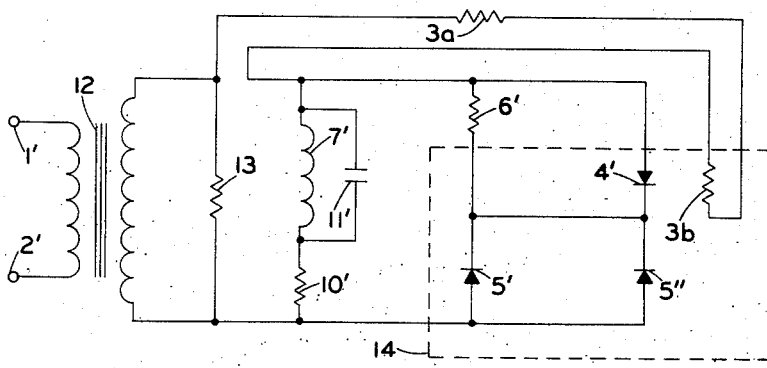

For a better understanding of our invention, reference may be had to the accompanying drawings in which:

Figure 1 is a circuit diagram embodying the invention;
Figure 2 is a plot indicating typical voltage relationships of the circuit of Figure 1; and,
Figure 3 is a variation of the circuit thereof utilizing a transformer coupled input and illustrating a temperature compensating arrangement.

Referring to Figure 1, the alternating current signal to be measured is applied across input terminals 1 and 2 and through series resistor or resistance 3 to the diodes 4 and 5 connected in series in a back-to-back arrangement with like elements connected together. Diode 5 is of the Zener type while diode 4 may be of a conventional type. A shunt resistor or resistance 6 is connected in parallel with diode 4. A D.-C. instrument 7 which may include a series current limiting resistor 10 is connected across the ends of the diodes 4 and 5. The instrument 7 may conveniently be of the zero-left milliammeter type. The instrument is connected such as to make the instrument pointer deflect or attempt to deflect down scale or to the left for current flow from point 9, the junction between resistor 6 and the instrument 7, to terminal 2, and to deflect up scale for current flow which is in the reverse direction through the instrument.

Diode 5 is of the Zener type and therefore exhibits a voltage regulating characteristic. When an A.-C. signal is connected to a Zener diode through a series resistor such that the polarity is the reverse of that required for normal conduction, the reverse voltage drop across the diode is the applied voltage until the applied voltage equals the Zener voltage. The diode then breaks down and the Zener voltage is held substantially constant for all increases of A.-C. signal and will remain so until the applied voltage decreases to the Zener value at which time the diode will again become an open circuit and the voltage drop across the diode will be coincident with the applied voltage until reversal of the voltage wave takes place.

In operation of the circuit of Figure 1 at low voltages below the minimum scale value, the Zener diode 5 blocks all current flow in the branch circuit comprising diodes 4 and 5 and resistor 6 in the direction indicated $I_F$ in Figure 1 during alternations when point 9 is positive relative to terminal 2. During such alternations, hereinafter designated the forward ½ cycle, current flows downward through the instrument 7 without any shunting effect of the diodes. On the next alternation when terminal 2 is positive, hereinafter designated the reverse ½ cycle, current flow indicated in Figure 1 as $I_R$ by-passes the instrument through diode 5 and resistor 6.

Since 7 is a D.-C. instrument, it measures the average voltage across it, or in other words, the difference between the forward and reverse cycle signals applied to it. The instrument 7 would, therefore, tend to read less than the minimum value of the scale, since more current flows downward through the instrument from point 9 to terminal 2 during the forward ½ cycle than flows in the reverse direction during the reverse ½ cycle at signal voltages below the minimum scale value.

When the input voltage, indicated $V_{ac}$ on Figure 1 is greater than the Zener voltage of diode 5, diode 5 breaks down during forward ½ cycles and a current flow downward through the diodes and designated $I_F$ takes place. During such alternations, diode 4 effectively shorts out resistance 6 so that the voltage seen by the instrument 7 and designated $V_I$ on Figure 1, is equal to the Zener voltage $V_Z$.

On the reverse half cycle, current flows through the Zener diode 5 and up through the resistance 6 and indicated by $I_R$ on Figure 1. The diode 4 is substantially an open circuit for current flow in this direction and the instrument sees a voltage $V_I$ equal to $I_R R_6$.

Since the instrument 7 is an averaging instrument, it in effect compares the voltages $E_{Zener}$ and $I_R R_6$. The instrument will not give a false reading as long as $I_R R_6$ is less than the Zener voltage, because resultant average current flow in the instrument is negative and from point 9 to conductor 2 tending to cause a down scale reading. A plot of the voltage $V_I$ seen by the instrument 7 in a typical circuit is shown for increasing values of $V_{ac}$ in Figure 2.

Referring to Figure 2, it is seen that voltage $V_I$ at lower values of $V_{ac}$ is negative indicating that the resultant current flow through the instrument tends to cause a downscale deflection. The negative voltage $V_I$ increases proportionate to an increase of $V_{ac}$ until $V_I$ equals $V_{Zener}$ at which voltage breakdown of the Zener diode occurs and the instrument begins the comparison of $V_{Zener}$ and $I_R R_6$. $V_I$ then increases in a positive direction and when $I_R R_6$ equals $V_{Zener}$ the voltage $V_I$ and D.-C. current flow is zero. Further increase of $V_{ac}$ results in $I_R R_6$ being larger than $V_{Zener}$ by an amount dependent on the magnitude of the increase. The difference of $I_R R_6$ and $V_{Zener}$ as compared by the instrument 7 is now positive and the instrument measures such difference as an indication of the magnitude of $V_{ac}$. At voltages at which $V_I$ is positive, the following approximate relationship is useful for design purposes:

$$V_I \cong \frac{V_{ac}}{1.11}\left(\frac{R_6 R_{10}}{R_3(R_6+R_{10})+R_6 R_{10}}\right) - V_{Zener}$$

It is preferable to utilize a zero-left type of instrument with the measurement range being in the region where $V_I$ is positive such as the range indicated as "B" on Figure 2. If the voltage range to be measured varies about a particular voltage, a zero-center instrument might be utilized with a measurement range such as indicated as "A" on Figure 2. However, it should be realized that with such an arrangement the instrument will give false readings to the left of center if $V_{ac}$ is of a value between zero and that indicated as "X" on Figure 2. At voltages of $V_{ac}$ above "X" and below the lower value of range "A" the instrument will be deflected off scale to the left so as to preclude a false reading.

In order to minimize vibration or jitter of the instrument movement, a capacitor 11 may be placed in shunt with the instrument movement. Alternatively, a reactor coil can be substituted for series resistor 3 in order to minimize instrument vibration. The Zener diode 5 may comprise two or more diodes in series in order to obtain the desired voltage ratings, and at the same time increase the back resistance. Resistor 6 may conveniently be of the adjustable type to facilitate calibration of the instrument.

The following table lists the values of circuit components which have been found to be desirable for an A.-C. voltmeter of the circuit configuration shown in Figure 1 and which is suitable for a measurement range of 110–130 volts, at 60 cycles, A.-C. to produce a characteristic such as that shown in Figure 2.

| Part designation: | Value |
| --- | --- |
| Resistor 3 | 3000 ohms. |
| Resistor 6 | 2700 ohms. |
| Resistor 10 | 4000 ohms. |
| Zener diode 5 | 2 Transitron Type SV-18 (in series). |
| Diode 4 | Ratheon Type 460 silicon junction. |
| Capacitor 11 | 45 μf. 3.75 volts tantalytic |
| Instrument 7 | General Electric Type DB-18, 0–0.5 ma., 600 ohms. |

Figure 3 shows a transformer coupled variation of Figure 1 which adapts the circuit of Figure 1 to the measurement of voltages and currents outside the range of the Zener diodes used. Limited span A.-C. current measurement is accomplished through use of a transformer 12 having a load resistor 13 connected across the transformer secondary producing a voltage drop proportional to transformer current flow and measuring the voltage drop in the manner of the circuit shown in Figure 1. It should be noted that components of Figure 3 corresponding to those of Figure 1 are marked with prime (') accents.

It has been found that if the diodes 4' and 5' do not exhibit the desired coefficient of temperature characteristic, the temperature characteristics can be improved by having the resistor or a part thereof such as 3b of the thermistor type, which exhibits a positive temperature coefficient of resistance, placed within a thermally insulated chamber 14 along with diodes 4' and 5'. Such an arrangement can also be used with the circuit shown in Figure 1.

The series resistor 3 may be of the squaring type such as silicon carbide. The use of the resistors non-linear characteristics will result in current flow in resistor 6 which will vary as the square of the instantaneous voltage. The instrument can then be calibrated to measure R.M.S. values instead of average values.

If Zener diode 5 or 5' comprises a plurality of individual diodes connected in series to obtain the desired Zener voltage the forward resistance offered to current flow in the direction $I_R$ of Figure 1 may cease to be insignificant and reading variations with temperature may become noticeable. The problem may be corrected by connecting an additional diode 5" in parallel as shown in Figure 3. Since 5" does not have to exhibit Zener characteristics and is only used in decreasing the forward resistance of the Zener diode, it may be a single diode of a conventional type such as diode 4 with such conventional diodes being presently available with voltage ratings equal to three or more Zener diodes in series.

It should be appreciated that since the circuits of Figures 1 and 3 operate through a comparison of forward and reverse half cycles of the signal under measurement with both half cycles containing any wave form variations or hormonics present, there is a cancellation of such effects. The instrument thus has improved insensitively to such sources of measurement error as compared with other types of rectifying arrangements.

Having thus described the invention, it is to be understood that the foregoing disclosure relates only to preferred embodiments of our invention and that numerous modifications or alterations may be made therein without departing from the spirit and scope of the invention as set forth in the appended claims.

What we claim as new and desire to secure by Letters Patent of the United States is:

1. A suppressed zero A.-C. voltmeter comprising a first and a second diode in series with their outer ends adapted to be connected to an alternating signal through a first impedance, the first of said diodes having a reverse conduction characteristic in said series circuit which includes a region of substantially constant voltage across said first diode for reverse voltages which exceed a critical voltage, said diodes connected such that like elements are tied together at a common junction, a second impedance in shunt with said second diode, and a D.-C. indicating instrument connected across the ends of the diodes such that voltages outside a predetermined range tend to cause an off-scale deflection.

2. A suppressed zero A.-C. voltmeter comprising a first and a second diode in series with their outer ends adapted to be connected to an alternating signal, through a first impedance, the first of said diodes having a reverse conduction characteristic in said series circuit which includes a region of substantially constant voltage across said first diode for reverse voltages which exceed a critical voltage, said diodes connected such that like elements are tied together at the common junction, a second impedance in shunt with said second diode, a D.-C. instrument across the said ends of said diodes such that voltages outside a predetermined range tend to cause an off-scale deflection, and a capacitor in shunt with said instrument in order to minimize vibration.

3. A suppressed zero A.-C. voltmeter comprising a transformer having a primary and a secondary winding with the primary adapted to be connected to an alternating signal to be measured, the secondary connected through an impedance to a first and a second diode in series, the first of said diodes exhibiting Zener characteristics upon breakdown, said diodes connected such that like elements are tied together at their common junction, a resistor in shunt with said second diode, a D.-C. instrument across the ends of said diodes, and a capacitor in shunt with said instrument.

4. A suppressed zero A.-C. voltmeter comprising a first and a second diode in series with their outer ends adapted to be connected to an alternating signal through a first resistor, the first of said diodes exhibiting Zener characteristics upon breakdown, said diodes connected such that like elements are tied together at a common junction, a second resistor in shunt with said second diode, and a D.-C. instrument connected across the ends of the diodes such that voltages outside a preselected range tend to cause an off-scale deflection, said first resistor having at least a portion thereof physically enclosed within a thermally insulated chamber with said diodes.

5. A suppressed zero A.-C. voltmeter comprising a first and a second diode in series with their outer ends adapted to be connected to an alternating signal through a first resistance, the first of said diodes having a reverse conduction characteristic in said series circuit which includes a region of substantially constant voltage across said first diode for reverse voltages which exceed a critical voltage, said diodes connected such that like elements are tied together at a common junction, a second resistance in shunt with said second diode, and a D.-C. indicating instrument connected across the ends of the diodes to indicate the difference voltage between the alternating signal and the critical voltage.

References Cited in the file of this patent

UNITED STATES PATENTS 2,854,651    Kircher _____ Sept. 30, 1958

FOREIGN PATENTS 780,118    Great Britain _____ July 31, 1957